Nov. 24, 1931.  J. H. RENSHAW  1,833,795
METHOD OF ATTACHING BAILS TO CONTAINERS AND THE LIKE
Filed Feb. 8, 1930
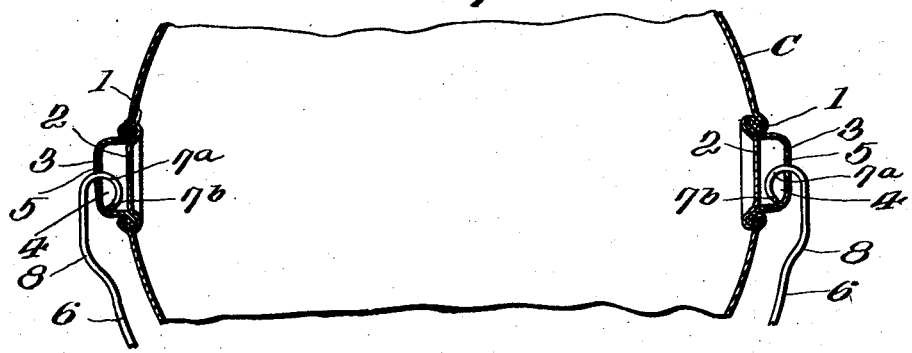
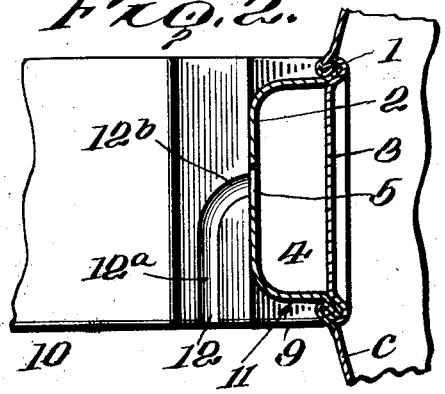 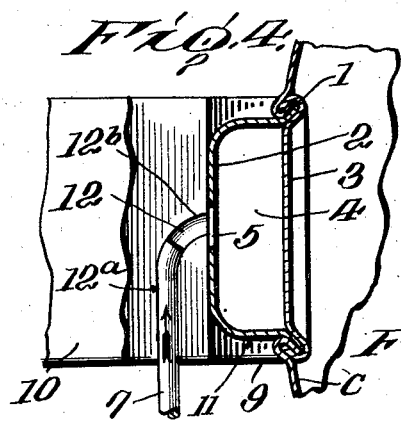
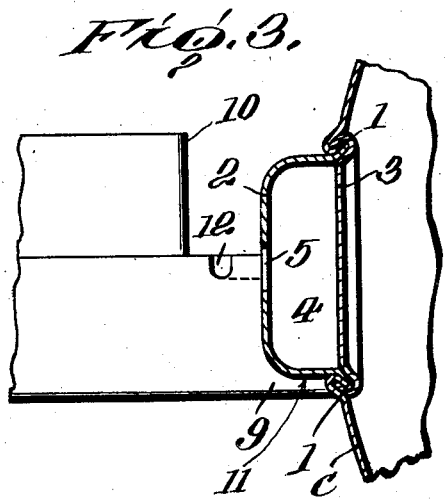 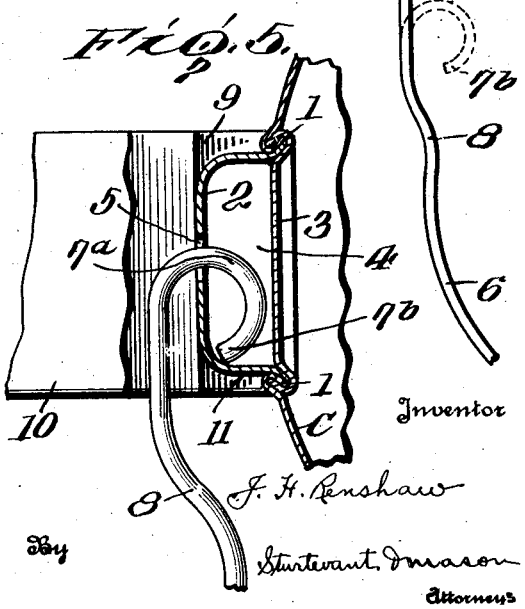

Patented Nov. 24, 1931

1,833,795

UNITED STATES PATENT OFFICE

JOSEPH HOWARD RENSHAW, OF CINCINNATI, OHIO, ASSIGNOR TO CONTINENTAL CAN COMPANY, INC., OF NEW YORK, N. Y., A CORPORATION OF NEW YORK

METHOD OF ATTACHING BAILS TO CONTAINERS AND THE LIKE

Application filed February 8, 1930. Serial No. 426,918.

The invention relates to new and useful improvements in a method of attaching bails to containers, pails and the like.

An object of the invention is to provide a method whereby the bail end as it is inserted in the ear is shaped so that it cannot be detached from the ear without distorting the bail end.

A further object of the invention is to provide a method whereby the bail end may be passed through a die and projected into the ear and wherein the portion extending into the ear is so shaped through the aid of the die as to prevent the detaching of the bail end from the ear without distorting the metal in the bail end.

These and other objects will in part be obvious and will in part be hereinafter more fully disclosed.

In the drawings which show by way of illustration one embodiment of the invention:—

Figure 1 is a view showing a portion of a container with the bail attached thereto by the improved method.

Fig. 2 is a view showing in plan the die for shaping the bail positioned relative to the ear for the insertion of a bail end therein and with the upper member of the die withdrawn to show the shaping groove in plan.

Fig. 3 is a side view of the parts shown in Fig. 2.

Fig. 4 is a view similar to Fig. 2 showing the end of the bail inserted a short distance into the die shaping groove.

Fig. 5 is a view similar to Fig. 2 showing the bail end as having passed all the way through the die and attached to the ear.

Fig. 6 is a view showing one end of the bail prior to the insertion of the same through the shaping die.

The invention is directed broadly to a method of attaching bails to containers, pails and the like, and more particularly the attaching of a wire bail to an ear on the container. It is desirable to place the ear on the container at a point beneath the upper end of the container and in such a way that there is no opening through the wall of the container. This greatly facilitates the packing and handling of the container. It has been a common practice to provide containers with a dome-shaped ear having a perforation in its outer wall and this dome-shaped ear is connected to the body either by soldering or by bumping. It is preferable to provide the ear with an inner wall so that there is a closed chamber except for the opening through which the bail passes into the ear.

The present invention has to do with a method of attaching a wire bail to an ear of the above type and consists in shaping the bail end as it is received in the ear so as to produce a shaped end within the ear which prevents the bail from being detached from the ear during handling and storing.

The invention as illustrated in the drawings is embodied in a die shaping device through which the bail end is passed as it is inserted in the ear. There is a die shaping device associated with each ear and both ends are simultaneously inserted in their respective ears and shaped so as to be permanently attached to the container. The die shaping device is provided with a shaping groove which receives the end of the wire bail and as the bail end is forced into the die groove, it will be curved progressively and as it is curved the bail end is passed through the opening leading to the ear, and thus it is that the end of the bail is given a curved shape within the ear chamber which prevents the end of the bail from being unhooked or released from the ear.

The invention will possibly be better understood by a brief reference to the drawings which show one embodiment of the invention. In the drawings, the container is indicated at C and the ears which are attached to the container at 1, 1. The ear is dome-shaped and is provided with an inner wall 2 spaced from the outer wall 3, thus forming an inner chamber 4. The outer wall 3 is provided with an opening 5. The bail is indicated at 6 in the drawings. Both ends of the bail are similarly shaped and the invention will be described in connection with the attaching of one end only to an ear, it being understood that the other end is simultaneously attached to the other ear in the same manner.

The bail 6 is first formed with a straight bail end 7, as shown in Fig. 6. There is preferably an offset 8 between the bail end 7 and the body portion of the bail. The bail end is shaped as it is attached to the ear by a shaping die which consists of a lower member 9 and an upper member 10. These two members are attached to each other so that one may slide on the other. These two members are provided at their inner ends with a recess 11 which is adapted to fit over the ear on the container and thus locate the ear of the container relative to the shaping die. The lower member 9 of the shaping die is provided with a shaping groove 12. This shaping groove 12 has a straight portion 12a at the receiving end thereof and a curved portion 12b at the delivery end thereof.

When the ear is placed in the recess in the shaping die the opening 5 is directly opposite the delivery end of the shaping groove 12. The bail end 7 is inserted in the receiving end of the shaping groove 12 as indicated in Fig. 4, and by pressure is forced endwise into this shaping groove. When the end of the bail comes into contact with the curved portion 12b, it will be permanently curved. The end is passed through the opening and a continued endwise movement of the bail causes the curved shaped end to pass into the ear and the portion of the bail which passes from the delivery end of the die is progressively curved. This permits the end of the bail to be passed through the opening in the ear as it is curved and a permanently curved end formed on that portion of the bail which is within the ear.

After the bail end has been fully inserted in the ear then the upper member 10 of the die is slid laterally uncovering the shaping groove and the lower portion of the die lowered or the bail raised so as to release it from the die. This completes the attachment of the bail to the ear of the container.

It will be noted that the curved portion 7a of the bail end which is disposed within the ear is curved about a relatively short radius. The extreme end 7b of the bail overhangs the portion 7a and lies in engagement with or substantially in engagement with the inner wall 3 of the ear. The curved end lies very close to the inner wall 2 of the ear. The bail may be freely swung from a horizontal to a vertical position, but the end of the bail is shaped so that it cannot be detached from the ear without a straightening out of this curved portion within the ear.

While the bail end is shown as curved so as to substantially extend across the chamber within the ear and with the end of the bail in contact with the front wall, it will be understood that it may be otherwise shaped without departing from the spirit of the invention as set forth in the appended claims. The essential feature resides in the utilizing of a shaping die which progressively shapes the end of the bail as it is inserted through the opening into the ear and wherein this shaping of the end is of such a character as to permanently attach the bail to the ear.

It will be noted from the above that the method described permits the bail to be attached to the ear after the ear has been attached to the container. This greatly facilitates and cheapens the method of making containers with bails wherein the bail is permanently attached to the ear and the ear is of such a character that it is not possible to reach the inner end of the bail and shape it after it has passed through the opening in the ear.

Having fully described my invention, what I claim as new and desire to secure by Letters Patent, is:—

1. The method of attaching bails to containers consisting in passing the bail end endwise through a shaping die associated with the ear and progressively shaping the end of the bail as it is inserted through the opening in the ear for permanently attaching the bail to the ear.

2. The method of attaching bails to containers consisting in inserting the bail end in a shaping groove of a die associated with the ear, which groove is curved and terminates opposite the opening in the ear whereby the bail end is progressively shaped as it is inserted through the opening in the ear for permanently attaching the bail to the ear.

3. The method of attaching bails to containers consisting in passing the bail end through a shaping groove in a sectional die, which die is associated with the ear so that the delivery end of the groove is opposite the opening in the ear whereby the bail end as it passes from the die will be passed through the opening and into the ear, said groove being shaped so as to permanently attach the bail end to the ear.

4. The method of attaching bails to containers consisting in passing the bail end through a shaping groove in a sectional die, which die is associated with the ear so that the delivery end of the groove is opposite the opening in the ear whereby the bail end as it passes from the die will be passed through the opening and into the ear, said groove being shaped so as to permanently attach the bail end to the ear, and subsequently separating the die sections and removing the bail by a lateral movement relative to the die from said groove.

In testimony whereof, I affix my signature.

J. HOWARD RENSHAW.